US012518906B2

(12) United States Patent
Bullock

(10) Patent No.: US 12,518,906 B2
(45) Date of Patent: Jan. 6, 2026

(54) OMNIDIRECTIONAL COMMUNICATION DEVICE

(71) Applicant: Vortexon Inc., Dover, DE (US)

(72) Inventor: Eric Stephen Rees Bullock, Vancouver (CA)

( * ) Notice: Subject to any disclaimer, the term of this patent is extended or adjusted under 35 U.S.C. 154(b) by 837 days.

(21) Appl. No.: 17/729,248

(22) Filed: Apr. 26, 2022

(65) Prior Publication Data

US 2022/0344819 A1 Oct. 27, 2022

Related U.S. Application Data

(60) Provisional application No. 63/179,664, filed on Apr. 26, 2021.

(51) Int. Cl.

| | |
|---|---|
| ***H01Q 7/00*** | (2006.01) |
| ***H01F 17/04*** | (2006.01) |
| ***H01F 27/28*** | (2006.01) |
| ***H01F 38/14*** | (2006.01) |
| ***H01Q 7/06*** | (2006.01) |

(52) U.S. Cl.
CPC ........... *H01F 17/045* (2013.01); *H01F 38/14* (2013.01)

(58) Field of Classification Search
CPC ........ H01F 17/04; H01F 17/045; H01F 27/02; H01F 27/28; H01F 38/14; H01Q 7/00; H01Q 7/06
See application file for complete search history.

(56) References Cited

U.S. PATENT DOCUMENTS

| | | | | |
|---|---|---|---|---|
| 6,538,617 | B2 * | 3/2003 | Rochelle | G08B 21/0263 343/788 |
| 9,543,068 | B2 * | 1/2017 | Aboush | H03L 7/099 |
| 9,991,040 | B2 * | 6/2018 | Sturcken | H01F 17/0013 |
| 10,134,520 | B2 * | 11/2018 | Moon | H01F 17/04 |
| 10,403,707 | B2 * | 9/2019 | We | H01F 27/292 |
| 11,862,867 | B2 * | 1/2024 | Nasu | H01F 19/04 |
| 11,869,703 | B2 * | 1/2024 | Sugie | H01F 17/045 |

* cited by examiner

*Primary Examiner* — Tho G Phan

(57) ABSTRACT

An atomic resonance communication device includes a central core to transmit and/or receive a signal. The device includes inductor coils surrounding the central core to generate electromagnetic fields within and impart rotational or gyroscopic spin to the central core. The device includes high voltage coils to generate a plasma field around and within the central core and within which the central core and the inductor coils rotate. The device includes a signal injection circuit to introduce the signal into the device in accordance with data to be transmitted. Rotation of the central core and the inductor coils within the plasma field modulates the signal, causing the central core to transmit the signal outside of the device.

30 Claims, 3 Drawing Sheets

OMNIDIRECTIONAL COMMUNICATION DEVICE

RELATED APPLICATIONS

This application claims priority to the provisional patent application filed on Apr. 26, 2021, and assigned provisional patent app. No. 63/179,664.

BACKGROUND

Communication devices permit data to be transmitted and received at different locations. For example, a transmitter device may transmit data at one location, which a receiver device receives at another location. A communication device may be able to function as both a transmitter device and a receiver device, so that it can both send and receive communication from another device. A communication device may be communicatively connected to a host computing device that provides the data to be transmitted by the communication device, and that receives the data that has been received by the communication.

DETAILED DESCRIPTION

Figure 1:
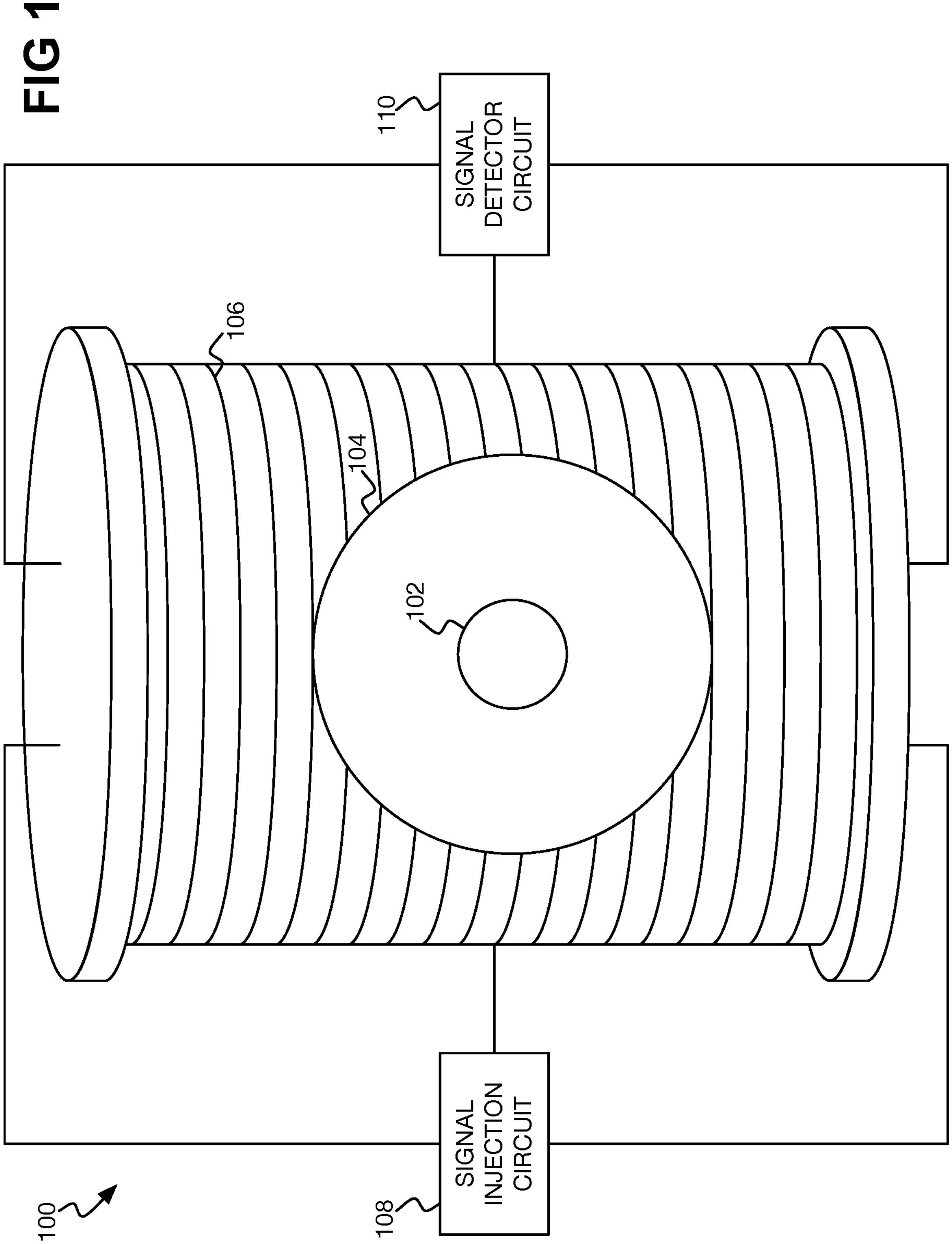
FIG. 1 is a front view diagram of an example atomic resonance communication device.

FIG. 1 shows a front view of an example atomic resonance communication device 100. The communication device 100 includes a central core 102, inductor coils 104, and high voltage coils 106. In the depicted example, the high voltage coils 106 can be cylindrical, whereas the inductor coils 104 can be ring, loop, or toroidal in shape, although both the high voltage coils 106 and the inductor coils 104 can also be spherical. The device 100 may be or include radio frequency coils (i.e., loop antennas), such as Helmholtz coils but which also can produce signals and magnetic fields throughout the device. Helmholtz coils can also be implemented externally to measure the magnetic fields.

The communication device 100 further includes a signal injection circuit 108 in an implementation in which the device 100 is to transmit a signal in accordance with data that may be encrypted or unencrypted. The communication device 100 can in addition or instead include a signal detector circuit 110 in an implementation in which the device 100 is to receive a signal that has been transmitted in accordance with data that may be encrypted or decrypted. The device 100 therefore can include either or both of the circuits 108 and 110. The circuits 108 and 110 are depicted in block form, but in actuality may be located in the center, on the sides and/or the top and bottom of the device 100. The circuits 108 and 110 may be directly mounted inside or around the device 100 or mounted to a removable or permanent cylindrical, spherical or toroidal cavity resonator, such as a vacuum chamber or shell resonator, and pointed at the central core 102 of the device 100. Further, the device 100 may function as a repeater or beacon/node and can produce and utilize fusion energy in accordance with magnetic confinement, inertial electrostatic confinement, and/or magneto-inertial fusion.

Either or both of the circuits 108 and 110 can be or include one or multiple devices that work together to communicate with the device 100 via a host computing device and/or software defined radio for sending/receiving, processing, measuring, analyzing, and storage of signals and/or data. For example, the detector circuit 110 may be one or multiple devices that work together to receive or intercept a signal from inside and/or outside the device. Examples of such a detector circuit 110 include silicon avalanche diodes, photodiodes, laser diodes, scintillators, antennas, photodetectors, magnetometers, photomultiplier tubes, flat-panel detectors, microchannel plate detectors, magnetic pickups, inductive sensors, resonant coils, plasma antennas, image sensors, optical sensors, and transducers. Furthermore, the device 100 may transmit and receive data via modems, oscillators, antennas, fiber optic cables and/or satellites.

The high voltage coils 106 generates an electromagnetic/electrostatic plasma field within which the central core 102 and the inductor coils 104 rotate. In another implementation, the high voltage coils 106 may be removed, to utilize just the inductor coils 104 and the central core 102 in an open system having zero confinement or traps, in which case magnetic confinement, including uniform and/or nonuniform magnetic fields, may be used as traps. The inductor coils 104 surround the central core 102. The inductor coils 104 modulate and demodulate the signal by varying inductance and strength of electromagnetic fields within and impart gyroscopic or rotational spin to the central core 102. The central core 102 rotates about an axis within the inductor coils 104.

In the case of signal transmission, the signal injection circuit 108 introduces a signal into the atomic resonance communication device 100 in accordance with data to be transmitted. That is, the signal represents the data to be transmitted, such as via the data being encoded within the signal. Rotation of the central core 102 and the inductor coils 104 within the plasma field modulates the signal. This causes the central core 102 to transmit the signal outside the communication device 100 via the field.

In the case of signal receipt, the central core 102 receives an atomic resonance signal transmitted from outside of the communication device 100 in accordance with data. That is, the signal represents data, such as via the data being encoded within the signal. Rotation of the central core 102 and the inductor coils 104 within the plasma field demodulates the signal. The signal detector circuit 110 detects the signal as has been demodulated, such that the data is received. In another example, the inductor coils 104 may be modulated with signal, with the signal detector circuit 110 then detecting the signal as modulated.

More generally, different techniques can be used to send and receive data (i.e., signals). Such techniques include electromagnetic wave transmission and detection, infrared transmission and detection, radio frequency/microwave transmission and detection, photonic transmission and detection, and electron and/or particle transmission and detection. In the infrared technique, infrared diodes, emitters, transmitters, and/or receivers may be employed. In the radio frequency technique, antennas, plasma antennas, Helmholtz coils, microwave transmitters, magnetrons, and/or other sources of electromagnetic radiation may be employed. In the photonic technique, photo emitters, photoelectric diodes, pumped lasers, laser diodes, and/or any other polarized or nonpolarized photon sources may be employed. In the electron and/or particle technique, particle accelerators, electron guns, magnetic lens, electrostatic lens, ion sources, and/or any other charged or neutral particle sources may be employed.

Figure 2:
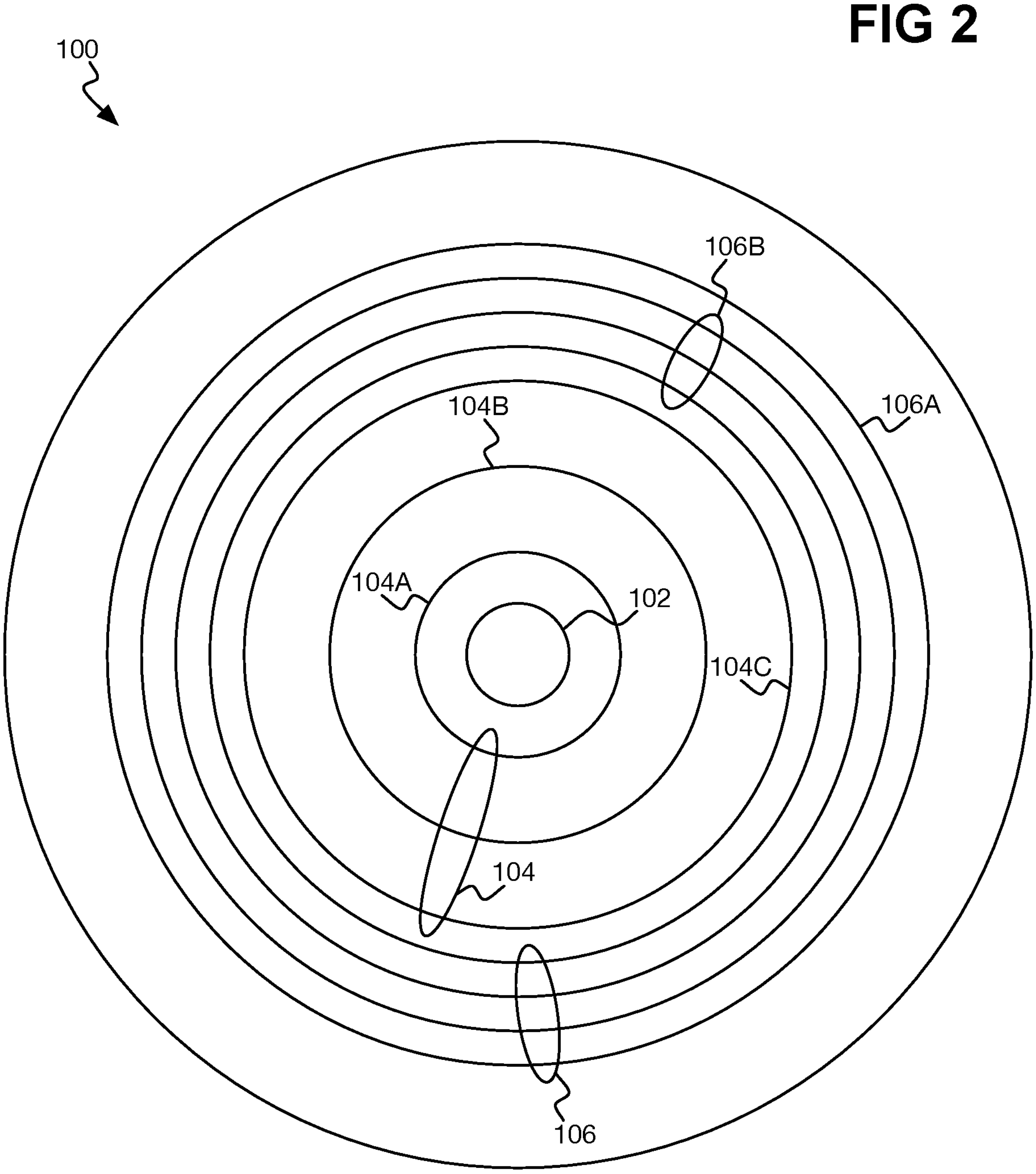
FIG. 2 is a top view diagram of the example atomic resonance communication device of FIG. 1, in which the high voltage coils and the inductor coils are depicted in detail.

FIG. 2 shows a top view of the example atomic resonance communication device 100, in which the high voltage coils 106 and the inductor coils 104 are depicted in detail. As noted above, in the depicted example, the high voltage coils 106 are cylindrical but can have another shape. By comparison, in the depicted example, the inductor coils 104 are ring, loop, or toroidal in shape, as also noted above, but can instead be spherical.

The high voltage coils 106 includes a primary high voltage coil 106A and one or multiple secondary high voltage coils 106B. The high voltage coils 106 generate a radio frequency electromagnetic or electrostatic plasma field as the plasma field in question. An example of the voltage of the coils 106 is between 0 volts and 12 million volts, and an example of the frequency of the resultant electromagnetic or electrostatic plasma field is between 0 hertz and 300 gigahertz. The high voltage coils 106 can also be referred to as resonant transformers. The coils 106, 102, 104, and 302 may have modulated driving circuits and/or input/output circuits having a frequency range between 1 hertz and 60 gigahertz, if not higher. The coils 106, 102, 104, and 302 are tunable and can be driven at all frequencies in the radio frequency domain. The input/output driving circuits for the coils 106, 102, 104, and 302 may include or be connected to a host computing device, a signal injection circuit, a signal detection circuit, an oscillator, a software-defined radio, an amplifier/rectifier, and/or a feedback circuit for sending/receiving, processing, measuring, analyzing, and storage of signals and/or data. In one implementation, the high voltage coils 106 and/or the inductor coils 104 and/or 302 may nevertheless be adjusted to accept low voltage alternating or direct current from 0.01 millivolts or higher if needed.

The primary high voltage coil 106A may be a helical coil, such as a helical resonator. The coil 106A may be an electromagnetic coil (i.e., a loading or primary coil) used as a radio wave resonator or filter, to induce voltage as well as signal into the inductor coils 104, the central core 102, inductor coils 302, as well as the secondary high voltage coils 106B. The primary high voltage coil 106A may have resonant inductive coupling with the secondary coils 106B, the inductor coils 104, and the central core 102. The helical resonator may include one coil or multiple coils, which can be single or multifilar, and which can be tunable to adjust the resonance, impedance and inductance. The shape of the coils 106 and 104 may be cylindrical, spherical, toroidal, square or any other shape and can be arranged in various topologies. The helical resonator along with the secondary high voltage coils 106B make a series of resonant transformers that can send and receive signal from high voltage plasma discharge. The secondary coils 106B can be arranged in various topologies and can form part of the circuits 108 and 110.

The rotational or gyroscopic electromagnetic fields generated by the inductor coils 104 and the plasma and/or material within the central core 102 interacts with the radio frequency electromagnetic or electrostatic plasma field generated by the high voltage coils 106 and the plasma within the central core 102, resulting in transmission and/or reception of the signal. In the case of signal transmission, the radio frequency electromagnetic or electrostatic plasma field traps particles and antiparticles of the central core 102 for transmission by the electromagnetic fields, resulting in transmission of the signal. Helmholtz coils may be employed to create a penning trap to measure and trap particles within the device 100 for as long as possible. In the case of signal receipt, the radio frequency electromagnetic or electrostatic plasma field traps particles and antiparticles received by the central core 102 according to the signal, resulting in receipt of the signal.

The high voltage coils 106 can be wound around a framework that surrounds and supports the inductor coils 104 and the central core 102 in the center. The inductor coils 104 and central core 102 may be inductively coupled or electrically connected to the high voltage coils 106, electrically and/or communicatively connected to a host computing device, via a control circuit using slip rings, or by using rotary transformers. There may be input/output circuits connected to each coil 106, 102, 104, and 302 and that can form part of circuits 108 and 110 to provide and collect signals and/or data for sending/receiving, processing, measuring, analyzing, and storage by a host computing device to which the communication device 100 is connected. Each high voltage coil 106 may be controlled via a corresponding high voltage coil circuit, specifically by controlling voltage, phase, frequency and current applied to the coil 106 and by modulating bridge rectifiers of the coil 106.

The high voltage coils 106 may have an air core, an iron core, or another type of core, and can include single, double, or multiple high voltage discharge coils arranged in a variety of topologies. For example, in a cylindrical topology, the secondary coils 106B and top loads can be inserted around and/or into the top and bottom of the cavity of the communication device 100. The top loads can be metal spheres, toroids, or otherwise referred to as electrodes which are connected to the secondary coils 106*b* to transmit high voltage plasma discharge and attract the signal for feedback, and can form part of the circuits 108 and 110. The primary coil 106A can then be wound around the framework encompassing the entire structure of the cavity of the device 100 in a cylindrical shape.

As another example, in a spherical topology, primary and secondary coils 106A and 106B can be spherically mounted. The top loads can be pointed into the center of the cavity of the communication device 100 and/or inserted into the top and bottom of the cavity. The primary coil 106A can be wound around the framework encompassing the entire structure of the cavity of the device 100 in a spherical shape.

As a third example, in a toroidal topology, the secondary coils 106B and the top loads can be mounted around and/or into the top and bottom of the cavity of the communication device 100. The primary coil 106A can then be wound around the framework encompassing the entire structure of the cavity of the device 100 in a toroidal shape.

As a fourth example, in a circular topology, a series of top and bottom pillars of the secondary coils 106B and center top loads can be circularly spaced apart from one another around and/or in the cavity of the communication device 100. The primary coil 106A can then be wound around the framework encompassing the entire structure of the cavity of the device 100 in any shape.

As to the inductor coils 104, they can include an innermost inductor coil 104A, one or multiple middle inductor coils 104B around the innermost inductor coil 104A, and an outermost inductor coil 104C around the middle inductor coils 104B, and can form part of the circuits 108 and 110. The inductor coils 104 are inductively or conductively/electrically connected (e.g., by parasitic or link induction) to the central core 102, and communicatively connected to an input/output circuit, host computing device, and/or a software-defined radio for sending/receiving, processing, measuring, analyzing, and storage of signals and/or data.

The middle inductor coils 104B generate a constantly changing electromagnetic flux as the electromagnetic fields. As such, the middle inductor coils 104 impart rotational or gyroscopic spin to the central core 102 via the innermost inductor coil 104A. The outermost inductor coil 104C supports the innermost inductor coil 104A and the middle inductor coils 104B, and may be inductively or conductively/electrically connected to the high voltage coils 106 and communicatively connected to an input/output circuit, host computing device, and/or a software-defined radio for sending/receiving, processing, measuring, analyzing, and storage of signals and/or data.

The inductor coils 104 can be connected electrically and arranged concentrically, rotating about various axes inside of one another to vary inductance and strength of the electromagnetic fields. The inductor coils 104 may be modulated or controlled independently of one another or linked together. The inductor coils 104 may be motorized or non-motorized, and/or may be able to freely move independently. The inductor coils 104 may be spun at the same speed or at different speeds, or may be stationary. The inductor coils 104 can spin for a specified amount of time, speed, and degrees of rotation. Electric motors and/or generators/alternators may be used in conjunction with the inductor coils 104 to ensure controlled spin, power/signal generation, and add torque to increase speed and overcome magnetic locking.

The inductor coils 104 can be toroidal in shape, or may have another shape. For example, the inductor coils 104 may be single ring, multiple ring, or spherical coils, as well as other shapes of coils. The inductor coils 104 can include circuits, laminated or coated conductor sheets, magnet wire, single wire conductor, and/or bifilar or multifilar wire. The inductor coils 104 can have an air, ferrite, or iron core, and be ferro fluid, liquid, or gas filled.

The inductor coils 104 can be core or air wound on a framework or be self-supported. If the coils 104 have a framework, the framework may be made from wood, metal, ferrites, crystals, silicon, plastics, rubber, foam, glass, reinforced concrete, ceramics, three-dimensionally (3D) printed material, cast material, or sintered material. The framework can thus include any material that a coil of wire can be wrapped around to give the resulting inductor coils 104 structure and strength.

Figure 3:
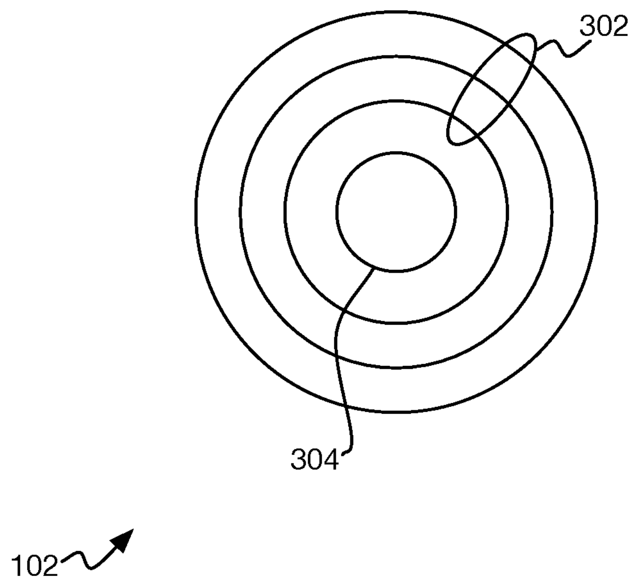
FIG. 3 is a diagram of an example central core of the atomic resonance communication device of FIG. 1.

FIG. 3 shows an example of the central core 102. The central core 102 can be motorized or non-motorized to rotate about an axis within the inductor coils 104, can be referred to as a plasma antenna, and can include one or multiple nested inductor coils 302 around a material 304. In the depicted example, the inductor coils 302 are spherical but can be another shape. The inductor coils 302 produce a consistent state of magnetic flux inside and outside of the core 102 to sense and trap the electromagnetic fields imparted by the material 304 within the inductor coils 302 and 104.

In the case of signal transmission, the inductor coils 302 vary the inductance and strength of the electromagnetic fields imparted by the inductor coils 104, specifically according to the signal injected by the signal injection circuit 108. Such variation modulates the signals and causes precession of the atomic nuclei within the material 304 and collapse of the electromagnetic fields within the material 304 according to the signal. In turn, collapse of the electromagnetic fields transmits electromagnetic waves from particles and/or antiparticles from the material 304 according to the signal, resulting in transmission of the signal.

In the case of signal receipt, the material 304 receives particles and/or antiparticles that have been transmitted according to a signal, which results in receipt of the signal. Receipt of the particles and/or antiparticles collapses the electromagnetic field within the material 304 according to the signal. This electromagnetic field collapse emits electromagnetic waves from the material 304 and varies the inductance and strength of the electromagnetic fields in the coil 302, which can then be detected by the signal detector circuit 110, such that the detector circuit 110 detects the signal.

The inductor coils 302 of the central core 102 may be spherical or another shape. The inductor coils 302 may be wrapped around a framework, which may be or include a hermetically sealed shell including the material 304. The inductor coils 302 can be inductively or conductively/electrically connected to the inductor coils 104, high voltage coils 106, and communicatively connected to a host computing device and/or a software-defined radio for sending/receiving, processing, measuring, analyzing, and storage of signals and/or data, and may be non-motorized or motorized to overcome magnetic locking or cogging.

The central core 102 rotates about an axis within the inductor coils 104, and can be connected electrically to the inductor coils 104, the high voltage coils 106, and communicatively connected to an input/output circuit, a host computing device, and/or a software-defined radio for sending/receiving, processing, measuring, analyzing, and storage of signals and/or data. The central core 102, and inductor coils 104 can have movable axis points with varying degrees of rotation that are free to rotate or that can be positionally controlled around various axis points of the device 100. For instance, motors, pins, slots, gears, rollers, skates, fixed connection points, bearings, and/or slew bearings may be employed in this respect.

The central core 102 transmits and receives signals/data while rotating within the modulated high voltage plasma and rotating or gyroscopic electromagnetic fields produced by the high voltage coils 106 and the inductor coils 104. The position of the central core 102 within these fields varies the inductance and strength of the modulated electromagnetic field within the core. Such variation produces a high energy state and collapse of the fields within the core, emitting electromagnetic waves from particles and/or antiparticles from the material 304, as noted above.

The central core 102 may be open air or encased within one or multiple hermetically sealed shells corresponding to the inductor coils 302, in which case the material 304 is encased within the innermost hermetically sealed shell corresponding to the innermost inductor coil 302. As one example, the hermetically sealed shells can be glass spheres or another type of sealed vessel. The hermetically sealed shells can be filled with solids, liquids, gases, atomized vapors, plasmas, or a partial vacuum. The central core 102 may be referred to as a plasma antenna and also include a spark transmitter/plasma antenna, electrodes/grids, ions, charged particles, and subatomic particles.

The material 304 may be, but is not limited to, different types of crystals, glasses, ceramics, powders, ferrites, gases, plasmas, atomized vapors, atoms, suspensions, plasmas, liquids, metals, and chemical elements. A non-exhaustive list of examples includes but is not limited to, for instance, ionic liquids, atomized vapors, Rydberg atoms, ferrite, sodium, boron, silicon, quartz, ruby, fluorite/fluorine, calcite, selenite, galena, spin glass, time crystals, hydrogen, tritium, argon, neon, nitrogen, oxygen, krypton, xenon, helium, hydrogen peroxide, water, deuterium, gallium, cesium, rubidium, mercury, metal lattice confinement, iron, nickel, silver, gold, aluminum, copper, tungsten, carbon, graphite, graphene, borophene, beryllium, and phosphorous. The material 304 emits signals in the form of electromagnetic waves from particles and/or antiparticles. These signals from particles and/or antiparticles interact with the high voltage plasma in the rotating or gyroscopic electromagnetic fields generated by the inductor coils and the high voltage coils 106, as noted above.

Next to the material 304 within the innermost inductor coil 302 of the central core 102 may be circuits to impart various physical (i.e., mechanical), electrical, and other forces on the material 304. Depending on the type of material 304 in question, such devices can include, but are not limited to, motors, gyroscopes, flywheels, inductors, capacitors, super capacitors, magnetrons/microwave emitters, plasma antennas, electroacoustic transducers, lasers, ferrite beads, lattices/grids, magnets, and electrodes/filaments. As an example of the latter, electrodes may be used to pulse voltage through the material.

As noted above, for signal transmission, the signal injection circuit 108 of the atomic resonance communication device 100 introduces a signal into the device 100 in accordance with data to be transmitted. The signal injection circuit 108 may be or include an electron emitter, an antenna, and/or a plasma antenna to deliver electrons or radio waves as the signal. As another example, the signal injection circuit 108 may be or include a particle accelerator to deliver charged particles, such as, but not limited to, electrons, ions, and protons, as the signal. As a third example, the signal injection circuit 108 may be or include a polarized or nonpolarized photon source or laser to deliver photons as the signal.

As also noted above, for signal receipt, the signal detector circuit 110 of the atomic resonance communication device 100 detects the signal as has been demodulated, and therefore detects the data in accordance with which the signal has been transmitted to the device 100. The signal detector circuit 110 can include, but is not limited to, one or multiple of a piezoelectric detector circuit, a semiconductor detector circuit, photodetector circuit, a photomultiplier tube circuit, an antenna circuit, an image sensor circuit, a microchannel plate detector circuit, a silicon avalanche detector circuit, a magnetic pickup circuit, a signal processing circuit, and or a plasma antenna circuit. The signal detector circuit 110 may additionally or instead detect, radio frequency, electromagnetic waves, acoustic vibrations, electrons/ions, charged particles, or photons received by the central core 102 as the signal.

An atomic resonance communication device 100 has been described that can transmit and receive data over great distances. The communication device 100 achieves this via a central core 102, inductor coils 104 surrounding the central core 102, and high voltage coils 106. In the case of signal transmission, rotation of the central core 102 and the inductor coils 104 within the plasma field generated by the high voltage coils 106 modulate the signal, which causes the central core 102 to transmit the signal outside the device 100. In the case of signal receipt, the central core 102 receives an atomic resonance signal transmitted from outside of the device 100, which is sensed by the plasma within the core 102 and the coils 302 and 304, demodulated via rotation of the central core 102 and the inductor coils 104 within the plasma field generated by the high voltage coils 106, and then detected.

Furthermore, in different implementations, the device 100 can produce and utilize fusion energy in accordance with magnetic confinement, inertial electrostatic confinement, and/or magneto-inertial fusion. In this case, heat resistant materials can be used as frameworks for the coils 104, 102, 106 and the entire device 100 may be encased in a fusion reactor shell and placed under partial vacuum. Also the central core 102 may be or include a fusion reactor in this implementation.

I claim:

1. An atomic resonance communication device comprising:
- a central core to transmit and/or receive a signal;
- inductor coils surrounding the central core to generate electromagnetic fields within and impart rotational or gyroscopic spin to the central core, the central core being motorized or non-motorized to rotate about an axis within the inductor coils;
- high voltage coils to generate a plasma field around and within which the central core and the inductor coils rotate; and
- a signal injection circuit to introduce the signal into the device in accordance with data to be transmitted,
- wherein rotation of the central core and the inductor coils within the plasma field modulates the signal, causing the central core to transmit the signal outside of the device.

2. The atomic resonance communication device of claim 1, wherein the central core comprises one or multiple nested inductor coils around a material to produce a consistent state of magnetic flux inside and outside of the central core to sense and trap the electromagnetic fields imparted by the material within the inductor coil of the central core,
- and wherein the material within the central core transmits and/or receives the signal.

3. The atomic resonance communication device of claim 2, wherein the one or multiple nested inductor coils vary an inductance and a strength of the electromagnetic fields according to the signal,
- wherein variation of the inductance and the strength of the electromagnetic fields collapses the electromagnetic fields within the material according to the signal,
- and wherein collapse of the electromagnetic fields transmits electromagnetic waves from either or both of particles and antiparticles from the material according to the signal, resulting in transmission of the signal.

4. The atomic resonance communication device of claim 2, wherein the material comprises one or multiple of: solids, powders, suspensions, liquids, gases, plasmas, atomized vapors, atoms, glass, ceramics, ferrites, sodium, boron, borosilicate, silicon, quartz, ruby, fluorite/fluorine, calcite, selenite, galena, spin glass, time crystals, hydrogen, tritium, argon, neon, nitrogen, oxygen, krypton, xenon, helium, hydrogen peroxide, water, deuterium, gallium, cesium, rubidium, mercury, metal lattice confinement, iron, nickel, silver, gold, aluminum, copper, tungsten, carbon, graphite, graphene, borophene, beryllium, and phosphorous.

5. The atomic resonance communication device of claim 1, wherein the inductor coils comprise:
- an innermost inductor coil inductively or conductively/electrically connected to the central core;
- one or multiple middle inductor coils around the innermost inductor coil to generate a constantly changing electromagnetic flux as the electromagnetic fields, imparting the rotational or gyroscopic spin to the central core via the innermost inductor coil; and an outermost inductor coil around the one or multiple middle inductor coils to support the innermost inductor coil, the one or multiple middle inductor coils, and the central core, and motorized or non-motorized, and inductively or conductively/electrically connected to the high voltage coils, and communicatively connected to a driving circuit and a host computing device and/or software-defined radio for sending/receiving, processing, measuring, analyzing, and storage of signals and/or data.

6. The atomic resonance communication device of claim 1, wherein the high voltage coils generate a radio frequency electromagnetic or electrostatic plasma field as the plasma field.

7. The atomic resonance communication device of claim 6, wherein the radio frequency electromagnetic or electrostatic plasma field traps particles and antiparticles of the central core for transmission by the electromagnetic fields, resulting in transmission of the signal.

8. The atomic resonance communication device of claim 1, wherein the signal injection circuit comprises an electron and/or ion emitter or antenna to deliver electrons and/or ions as the signal.

9. The atomic resonance communication device of claim 1, wherein the signal injection circuit comprises a particle accelerator to deliver charged particles as the signal.

10. The atomic resonance communication device of claim 1, wherein the signal injection circuit comprises a polarized or nonpolarized photon source or laser to deliver photons as the signal.

11. The atomic resonance communication device of claim 1, wherein the signal injection circuit comprises one or more of Helmholtz coils, loop antennas, radio frequency antennas, plasma antennas, magnetrons, and microwave transmitters to deliver radio frequency waves as the signal.

12. The atomic resonance communication device of claim 1, wherein the signal injection circuit comprises an infrared emitter to deliver infrared light as the signal.

13. The atomic resonance communication device of claim 1, wherein the signal injection circuit comprises inductor coils to deliver electromagnetic fields as the signal.

14. The atomic resonance communication device of claim 1, wherein the signal injection circuit comprises a high voltage discharge circuit to deliver radio frequency electromagnetic waves and high voltage discharge and/or plasma as the signal.

15. The atomic resonance communication device of claim 1, wherein the signal injection circuit comprises a driving circuit to deliver a pulsed voltage as the signal.

16. The atomic resonance communication device of claim 1, wherein the device is encased in a fusion reactor shell.

17. The atomic resonance communication device of claim 1, wherein the device functions as a repeater or as a beacon/node.

18. The atomic resonance communication device of claim 1, further comprising Helmholtz coils, wherein the central core comprises coils different than the inductor coils surrounding the central core and the high voltage coils, and wherein the Helmholtz coils, the high voltage coils, the inductor coils surrounding the central core, and/or the coils of the central core produce and/or sense electric and/or magnetic fields.

19. An atomic resonance communication device comprising:

a central core to receive a signal transmitted from outside of the device in accordance with data;

inductor coils surrounding the central core to generate electromagnetic fields within and impart rotational or gyroscopic spin to the central core, the central core being motorized or non-motorized to rotate about an axis within the inductor coils;

high voltage coils to generate a plasma field around and within the central core and within which the central core and the inductor coils rotate, rotation of the central core and the inductor coils within the plasma field demodulating the signal; and a signal detector circuit to detect the signal as has been demodulated.

20. The atomic resonance communication device of claim 19, wherein the central core comprises one or multiple nested inductor coils around a material and/or plasma to produce a consistent state of magnetic flux inside and outside of the central core to trap and sense the electromagnetic fields imparted by the material and/or the plasma within the inductor coil of the central core, and wherein the material and/or the plasma within the central core transmits and/or receives the signal.

21. The atomic resonance communication device of claim 20, wherein the material receives either or both of particles and antiparticles according to the signal, resulting in receipt of the signal, and wherein receipt of either or both of the particles and the antiparticles collapses the electromagnetic fields within the material according to the signal.

22. The atomic resonance communication device of claim 19, wherein the central core comprises a material, the material comprising one or multiple of: crystals, gases, ceramics, glass, powders, ferrites, plasmas, liquids, metals, atomized vapors, atoms, suspensions, and chemical elements.

23. The atomic resonance communication device of claim 19, wherein the inductor coils comprise:

an innermost inductor coil inductively or conductively/electrically connected to the central core;

one or multiple middle inductor coils around the innermost inductor coil to generate a constantly changing electromagnetic flux as the electromagnetic fields, imparting the rotational or gyroscopic spin to the central core via the innermost inductor coil; and an outermost inductor coil around the one or multiple middle inductor coils to support the innermost inductor coil, the one or multiple middle inductor coils, and the central core, and motorized or non-motorized, and inductively or conductively/electrically connected to the high voltage coils, and communicatively connected to a driving and/or input/output circuit and a host computing device and/or software-defined radio for sending/receiving, processing, measuring, analyzing, and storage of signals and/or data.

24. The atomic resonance communication device of claim 19, wherein the high voltage coils generate a radio frequency electromagnetic or electrostatic plasma field as the plasma field, and wherein the radio frequency electromagnetic or electrostatic plasma field traps particles and antiparticles received by the central core according to the signal, resulting in receipt of the signal, communicatively connected to a driving and/or input/output circuit and a host computing device and/or software-defined radio for sending/receiving, processing, measuring, analyzing, and storage of signals and/or data.

25. The atomic resonance communication device of claim 19, wherein the signal detector circuit comprises one or multiple of a silicon avalanche diode, a photodiode, a laser diode, a photomultiplier tube, a scintillator, an antenna, a plasma antenna, a photodetector, a magnetometer, a flat-panel detector, a microchannel plate detector, a magnetic pickup, an inductive sensor, a resonant coil antenna, an image sensor, an optical sensor, and a transducer, communicatively connected to an input/output circuit and a host computing device and/or software-defined radio for sending/receiving, processing, measuring, analyzing, and storage of signals and/or data.

26. The atomic resonance communication device of claim 19, wherein the signal detector circuit detects electrons received by the central core as the signal.

27. The atomic resonance communication device of claim 19, wherein the signal detector circuit detects charged particles (electrons, ions, neutrons, and/or protons) received by the central core as the signal.

28. The atomic resonance communication device of claim 19, wherein the signal detector circuit detects photons received by the central core as the signal.

29. The atomic resonance communication device of claim 19, wherein the signal detector circuit detects electromagnetic waves received by the central core as the signal.

30. The atomic resonance communication device of claim 19, wherein the signal detector circuit detects radio frequency waves received by the central core as the signal.

* * * * *